United States Patent [19]

Jenison

[11] Patent Number: 5,068,717
[45] Date of Patent: Nov. 26, 1991

[54] METHOD AND APPARATUS FOR SYNCHRONIZATION IN A DIGITAL COMPOSITE VIDEO SYSTEM

[76] Inventor: Timothy P. Jenison, 6237 SW. 23rd St., Topeka, Kans. 66614

[21] Appl. No.: 515,195

[22] Filed: Apr. 27, 1990

[51] Int. Cl.$^5$ .............................................. H04N 9/44
[52] U.S. Cl. ................................................. 358/17
[58] Field of Search ........................... 358/17, 19, 148

[56] References Cited

U.S. PATENT DOCUMENTS

| | | | |
|---|---|---|---|
| 4,063,288 | 12/1977 | Eckenbrecht et al. | 358/148 |
| 4,335,403 | 6/1982 | Srivastava | 358/148 |
| 4,339,770 | 7/1982 | Dennison et al. | 358/19 |
| 4,531,147 | 7/1985 | Kouyama | 358/17 |
| 4,646,136 | 2/1987 | Kouyama | 358/19 |

Primary Examiner—John W. Shepperd
Attorney, Agent, or Firm—Bruce J. Clark

[57] ABSTRACT

In a digital composite video processing system where the video signal has a color subcarrier $F_{sc}$, horizontal and vertical sync signals and produces multiple color fields, and where the system has system clock of frequency $nF_{sc}$ for digitizing and a horizontal counter counting to L incremented by the system clock, a method and apparatus is disclosed for synchronizing the system clock to color burst and synchronizing the horizontal counter to horizontal sync, whereby a window of width W clock counts wide is selected such that HSYNC is desired to occur at clock pulse $P+W/2$ when P is an integer; a determination is made whether HSYNC occurs before, within or after the window, the system counter is reset at counts $L-(n/2)$, L, or $L=(n/2)$ determined by where HSYNC appeared in relation to the window, and color reference signal is sampled to determine which of the four color fields is being processed, all in order to properly process the color video signals.

6 Claims, 4 Drawing Sheets

METHOD AND APPARATUS FOR SYNCHRONIZATION IN A DIGITAL COMPOSITE VIDEO SYSTEM

BACKGROUND OF THE INVENTION

In a composite digital video system, the video image is stored as a digital representation of the encoded color signal, where the color information is represented by an amplitude and phase modulated subcarrier. Generally, the signal is sampled at an integral multiple of the subcarrier frequency, e.g. 14.31818 MHz or four times the NTSC subcarrier frequency.

In a memory system based on the digital composite format, the sampling clock is phase-locked to the color burst present in the input signal. The digital samples are then placed sequentially in a memory device. If the entire waveform, including the color burst signal is then reconverted to analog form and sent to a receiver, proper color will result. If, however, the colorburst signal is not digitized into memory, it may be reconstructed on the fly during the reproducing process as may be the horizontal and vertical sync signals. This can save memory and also allows the device to produce a higher quality sync and burst waveform.

In order for this to be possible, the exact phase of the color reference signal must be determined before the image is placed in memory, since the colorburst signal and sync signals will not be recorded along with the image. The position of the vertical and horizontal synchronization pulses must also be unambiguously determined in order to properly generate memory addresses to store the image.

A particular problem is the relationship of the horizontal sync pulse to the color burst phase. Since the system clock must be based on the colorburst to insure correct color reproduction, the phase relationship of the system clock to the horizontal sync pulse is not known. While modern sync generation systems guarantee that the burst will be coherent, or in a constant phase relationship to the horizontal sync pulses, they do not necessarily have a predetermined relationship.

Thus, it is possible that the horizontal sync pulse will occur at exactly the same time as the system clock, causing the horizontal counter to be reset erratically, thus causing the image to jitter back and forth between two adjacent positions.

It is also necessary for the memory scanning counters in such a system to determine which of the four unique color fields are being written, so that when the image is read back from memory, the color information will be in the correct phase relationship to the synthesized colorburst signal.

It is therefore an object of this invention to lock a system clock generator to the input colorburst signal and also lock horizontal and vertical counters to the input sync signals in such a manner as to produce a stable image and exactly determine color phase and field number. In this process it is necessary to synchronize the system clock to the colorburst signal such that active transitions of the clock are in a known phase relationship to 0° and 90° points of the colorburst signal. The invention solves these problems by locking the horizontal counter to the to the external horizontal sync pulses such that the external pulse falls within a window that is three system clocks wide. If the pulse strays beyond the window, the counter is readjusted by two clock cycles to compensate. Thus, as long as the external horizontal sync pulse falls within the window, its exact relationship to the system clock is not important. Second, the external colorburst signal is sampled once every frame to determine which of the four unique color fields is being observed.

It is a further object of the invention to provide such a circuit that operates primarily in a digital format easily and cheaply implemented with integrated digital logic.

Other objects and features of the invention and the manner in which the invention achieves its purpose will be appreciated from the following description and the accompanying drawings which exemplify the invention, it being understood that changes may be made in the specific method and apparatus disclosed herein without departing from the essentials of the invention set forth in the appended claims.

BRIEF SUMMARY OF THE INVENTION

The invention locks the horizontal counter of a digital composite video processing system to the external horizontal sync pulses such that the external pulse falls within a window that is three system clocks wide. If the pulse strays beyond the window, the counter is readjusted by two clock cycles to compensate. The external colorburst signal is also sampled once every frame to determine which of the four unique color fields is being observed, and further adjusting to compensate for any two cycle clock adjustment previously made.

DESCRIPTION OF THE PREFERRED EMBODIMENTS

Figure 1:
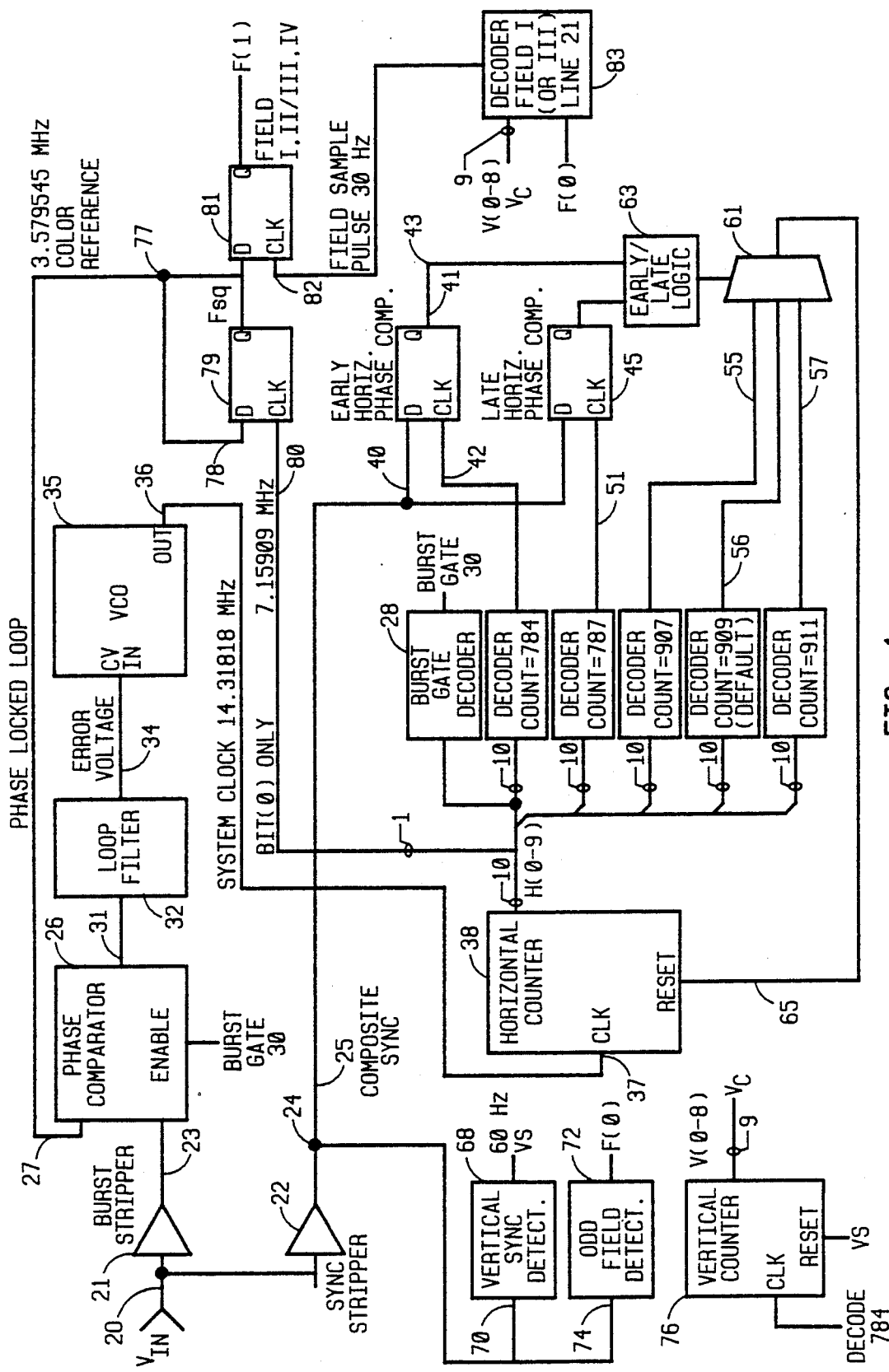
FIG. 1 is a block diagram of the invention.
Figure 2:
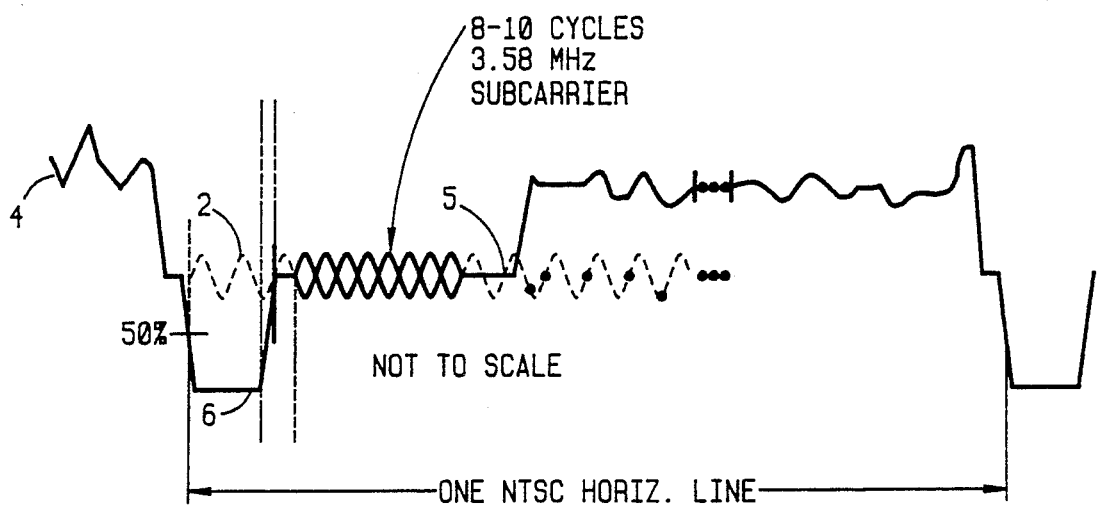
FIG. 2 is a diagram of one horizontal scan line of the horizontal signal with the invention's 14.3 MHz clock timing diagram shown along with other timing diagrams and signals at various points in the invention.

The preferred apparatus for carrying out the invention is shown in FIG. 1. In FIG. 2 the NTSC color composite signal is generally shown representing the video signal for one horizontal line of the television screen with the exception of the dashed lines 2 which represent the extrapolated color burst or color reference signal. The composite signal 4 includes the luminance signal at 4 and the color difference signals I and Q superimposed thereon represented by two signals each having a frequency of 3.58 MHz and 90° out of phase with each other. The color reference signal is shown also in FIG. 7. For the correct color information to be correctly processed, the system's own generated 3.58 MHz color reference signal must be in phase with the 3.58 MHz color burst signal, represented as 8-10 cycles of the color subcarrier frequency. Consequently, the system can constantly generate the necessary identical 3.58 MHz signal in phase with burst as shown at 2 as the horizontal scan proceeds. The dotted lines 2 represent the 3.58 MHz frequency generated by the system in phase with burst and are not part of the composite signal. The horizontal sync signal 6 and the vertical sync signal, along with the color burst signal, can be discarded and recreated by methods including specific sync and burst generation circuits, in order to recreate the required sync signals to be recombined with the processed video signal at output.

The preferred mode of the invention provides for a phase locking circuit, preferably a phase locked loop (PLL) circuit to lock the system clock to known phases of the color burst signal and to lock the system horizontal counter to the video horizontal sync pulses.

In the video effects system utilizing the invention, it is desired to reset the horizontal counter at 5 just before the active picture signal. Here the horizontal count is approximately 785 when the leading edge of the external horizontal sync occurs.

Figure 7:
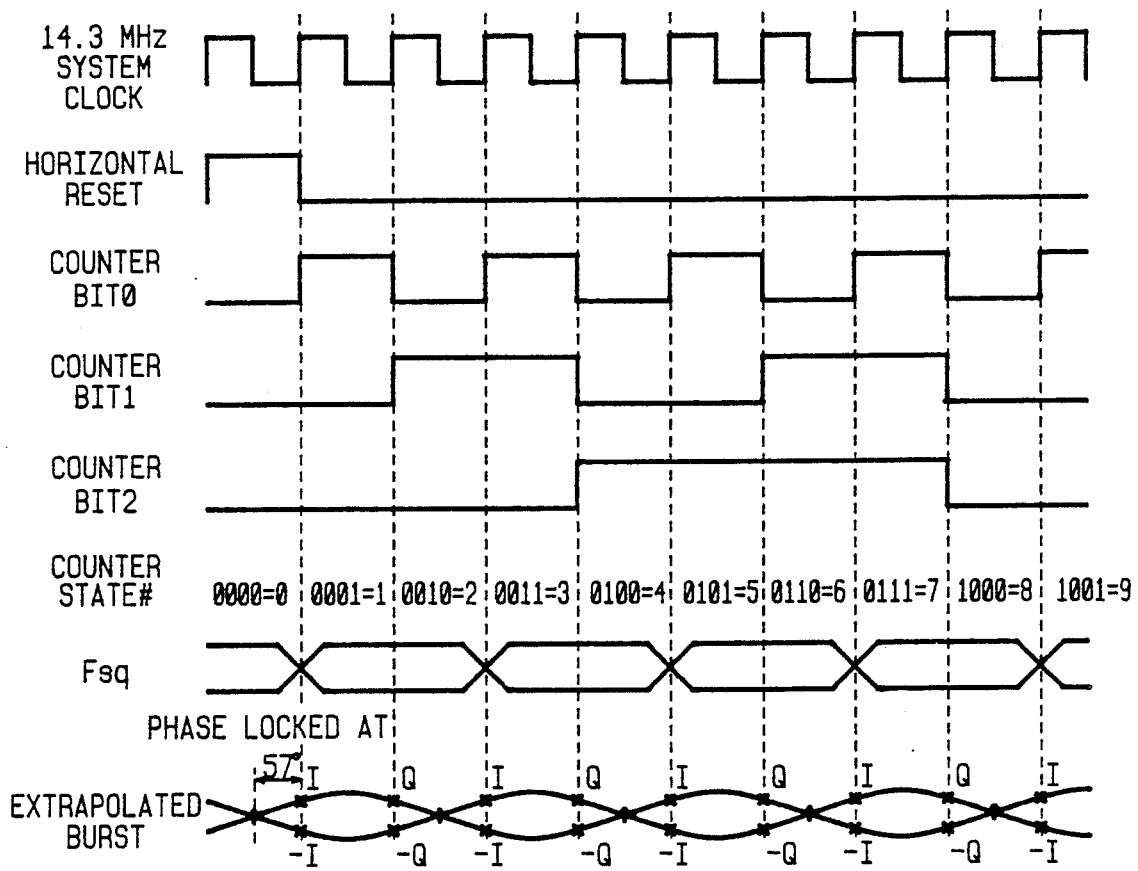
FIG. 7 is a timing diagram showing the signals at various points in the invention apparatus.

It is further desired to store two successive frames, i.e. four fields, in memory. These fields are shown in FIG. 7 and numbered as I, II, III, IV. Fields I and III are referred to as ODD fields and fields II and IV are referred to as EVEN fields. The color reference signal of interlaced fields I and II of frame one are 180° out of phase with each other as are fields III and IV 180° out of phase with each other. However, all four fields are necessary to accurately preserve the color information since ½ cycle of color subcarrier is left over at the end of fields II and IV. It can be seen that the composite signal fields I and III are 180° out of phase as are fields II and IV. It can be established whether a field is even or odd by processing the vertical sync signals at the start of the field in accordance with NTSC standards that specify the differences between even and odd vertical sync pulses. This ODD-EVEN detector establishes that a field is either a I/III or a II/IV, but cannot determine whether it is part of the first pair (I/II) or the second pair (III/IV). The method and apparatus for discriminating field I from field III is shown herein in conjunction with locking the phase and frequency discussed above.

In the invention, the composite video signal $V_{in}$ at 20 in FIG. 1 has separated or stripped from it the color burst signal and is squared to produce the stripped burst signal at logic levels at 23 in FIG. 1. The sync stripper strips the combined vertical and horizontal sync information to produce a composite sync signal 25 at digital logic levels. Although the composite sync contains both the horizontal and vertical sync pulses, the vertical sync pulses do not affect the operation of the horizontal lock circuit and therefore do not have to be removed. The stripped burst signal is fed to one input of the phase comparator 26 which is part of the burst phase locked loop circuit. The other input is connected to the 3.58 MHz color reference signal 27 based on the state of the horizontal counter 38 and will be described below. The phase locked loop is in a frequency multiplying configuration and its oscillator runs at four times the subcarrier frequency, or 14.31818 MHz. A burst gate signal at 30 is generated by decoding certain states of the horizontal counter 38 by the burst gate decoder 28 such that the signal 30 is active only during the time that burst is present on each scanline. This burst gate signal is used to activate the phase comparator which can assume a high impedance state when burst gate is inactive, effectively disconnecting it from the loop filter 32.

The loop filter 32 acts to integrate the digital pulses from the phase comparator 26, resulting in a d.c. voltage proportional to the duty cycle of the waveform from the phase comparator. This varying d.c. voltage represents the phase error between the 3.58 MHz color reference signal 27 and the incoming burst signal. This error signal adjusts the operating frequency of the voltage controlled crystal oscillator so that the oscillator locks to the phase of the incoming burst signal.

The 14.31818 MHz signal from the voltage controlled crystal oscillator becomes the master clock for the system as well as the "dot clock" used to activate the analog to digital converter and digital to analog converter.

The master clock is used to increment the horizontal counter. In normal operation, the counter is reset by a decoder which detects that the counter has reached state 909. Thus, the counter resets itself such that 910 system clocks occur between resets. The number 910 represents the master clock frequency divided by the horizontal sync frequency ($F_{sc}/F_{hs}$). Thus the counter resets once per horizontal scan line.

In the preferred mode, it is important to know at which clock count the horizontal sync is desired and therefore at which horizontal position on the scan line the horizontal counter is desired to reset to 0. As mentioned earlier, the particular digital video system used in this description requires that the horizontal counter reset occur just after the end of the colorburst signal just to the left of the active picture area. This means that horizontal sync would normally occur when the counter reaches state 785. When the system is first turned on, however, there is no known relationship between the counter reset and the external horizontal sync. However, once the burst phase locked loop is stable, the horizontal counter would maintain a fixed phase relationship to the external horizontal sync pulse, (determined by the conditions at power up) as the external horizontal sync pulse has the same exact frequency relationship to the colorburst signal as the horizontal counter has to the master clock divided by four. Thus the counter is locked to the external horizontal sync but is not likely to be in the proper phase relationship, i.e. with external sync occurring around counter state 785.

This phase synchronization is accomplished in the preferred mode with a horizontal lock circuit consisting of two horizontal counter decoders (Decoder 784 and Decoder 787 in FIG. 1), two phase detectors (41 and 45), early/late logic 63, and two additional reset decoders (Decoder 907 and Decoder 911 in FIG. 1) connected to the horizontal counter 38.

First, two counter states are decoded such that one of the outputs, called the early sample pulse, occurs just before the desired position of the external horizontal sync pulse, and the other, called the late sample pulse, occurs just after the desired position of the external horizontal sync pulse. Additionally, it is important that the late sample pulse occurs exactly three clock cycles after the early sample pulse. In this system the early sample pulse 42 occurs at count 784 and the late sample pulse 51 occurs at count 787.

Figure 5:
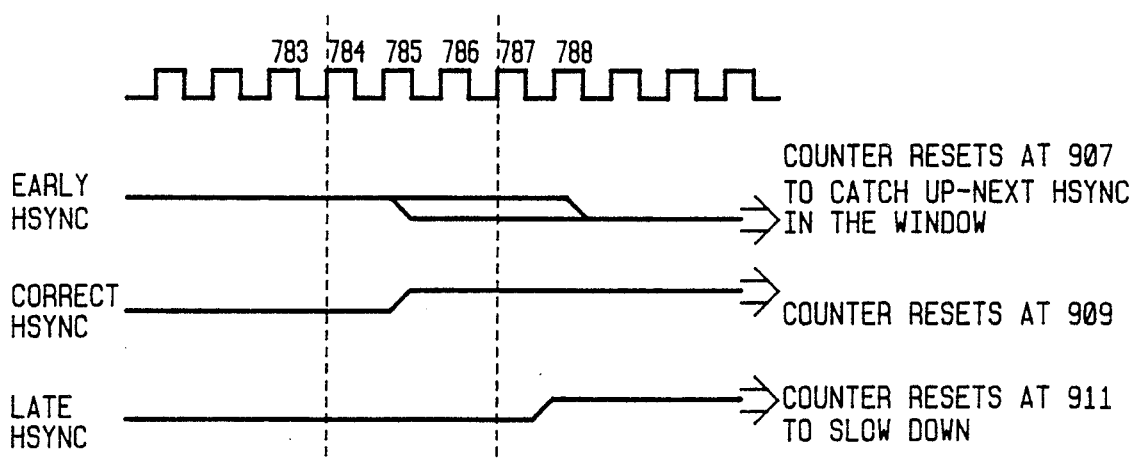
FIG. 5 is a diagram showing the various places the horizontal sync pulse might occur inside or outside the 3 cycle window of the invention and the movement of the window when the horizontal sync falls near the edges or outside.

The early and late sample pulses are input to the clock inputs of the flip-flops 41 and 45 forming the early horizontal phase comparator and the late horizontal phase comparator, respectively. The data inputs of both phase comparators are connected to the composite sync signal from the sync stripper. When the clock input of a flip-flop makes an active transition, the state of the external composite sync signal is latched and held by the flip-flop until the next active transition. Thus, if the leading edge of the external horizontal sync were in the ideal position, i.e. between the early and late sample pulses as shown in FIG. 5, the early horizontal phase comparator flip-flop would latch a low logic level (as the sync pulse has not yet occured) and the late horizontal phase comparator flip-flop would latch a high logic level (as the sync pulse has just gone active). If the external sync pulse occurred before the desired "window", both flip-flops would be in the high state. If the external sync pulse occurred after the three clock "window", both phase comparator outputs would be low. It is also possible that the early flip-flop would be high and the late flip-flop low. This would mean that the external sync pulse was just ending during the window time, meaning that it occurred too early.

Figure 3:
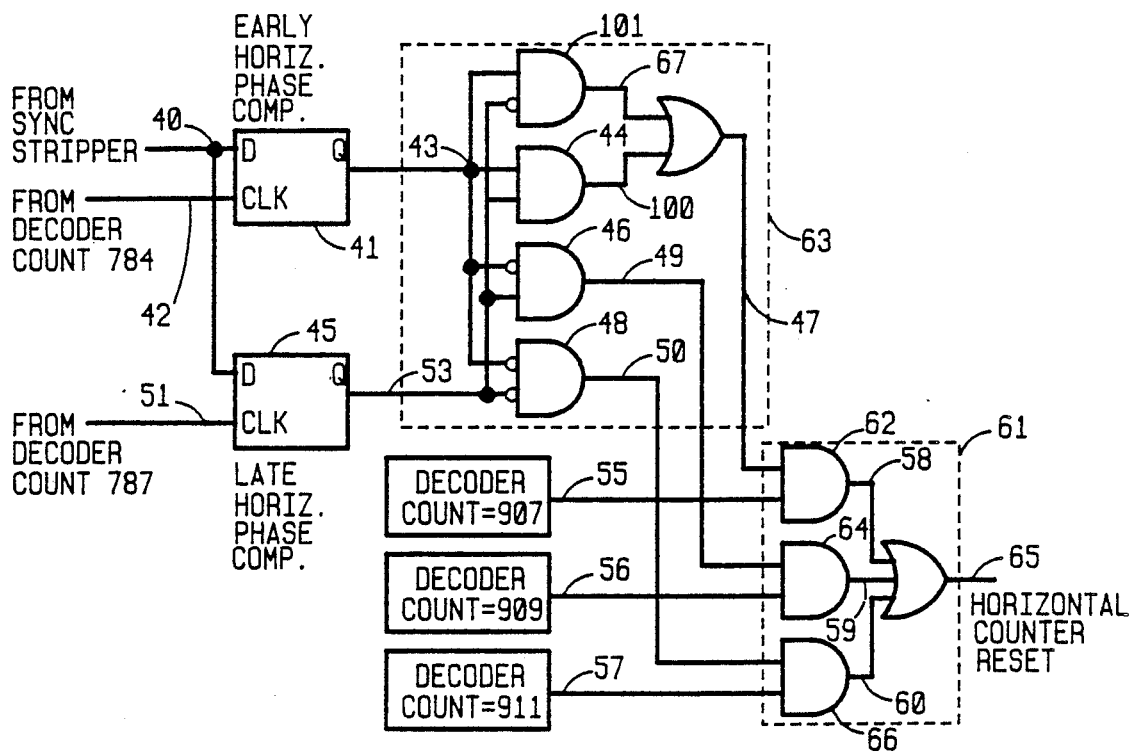
FIG. 3 is a block diagram depicting the elements of the comparison and Early-Late Logic portions of FIG. 1.

The outputs of the two horizontal phase comparators are then routed to early/late logic shown in FIG. 3 which acts to change the source of the reset signal of the horizontal counter, depending on the phase relationship of the external horizontal sync to the window of 3 clock cycles. In addition to the decoded 909 reset signal mentioned earlier, two additional reset signals are decoded from the counter; one that is two counts less than 909, and one that is two counts more than 909.

The early/late logic selects which of the reset signals is actually routed to the counter reset using the reset selector 51. If the external sync signal has occurred before the window, count 907 is used to reset the counter, thus causing the next reset pulse to occur two counts earlier. Conversely, if the external sync signal is later than the window, count 911 is used causing the counter to reset two counts later, bringing it closer to synchronization with the external horizontal sync. The count length is altered repeatedly until the external horizontal sync pulse falls within the window. When this occurs the early/late logic selects the standard 909 reset signal and the counter resumes cycling at exactly the horizontal sync rate, and the external sync pulse remains inside the 3 cycle window.

The number 909 is used because the desired length of the horizontal count is 910, which represents the system clock frequency divided by the horizontal line frequency (here 14.31818 MHz divided by 15760 Hz). Thus 909 is a number L where L is preferred as $(F_{sc}/F_{hs})-1$ where $F_{sc}$=the system clock frequency and $F_{hs}$=the horizontal line frequency. L could however be any number selected to work within the parameters of the system to lock in the manner described herein.

Figure 4:
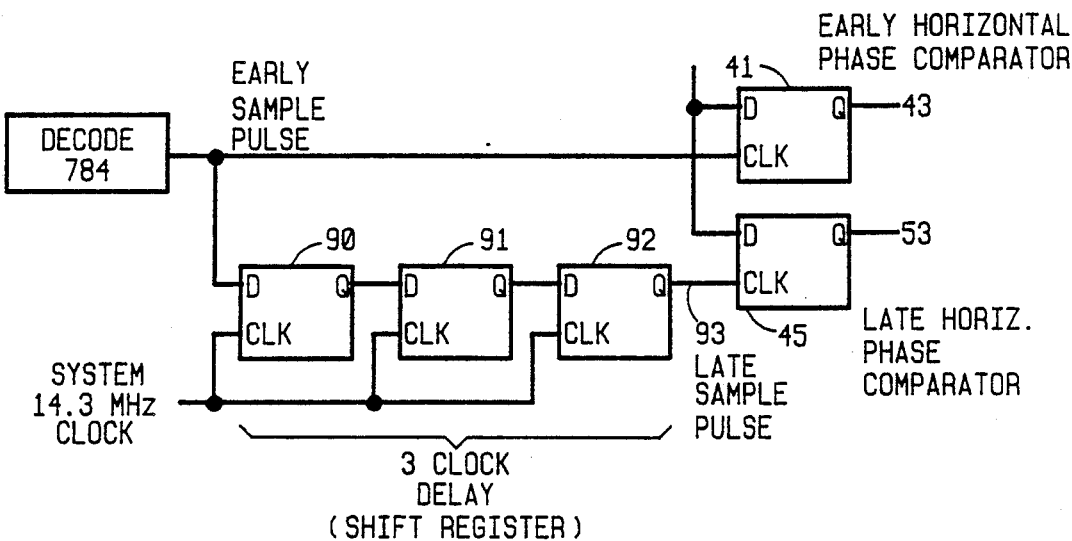
FIG. 4 is a diagram showing an alternative arrangement for the window decoder circuit in FIG. 3.

An alternative and simple method and apparatus for decoding the early and late sample pulses is shown in FIG. 4 where only the count 784 is decoded. The output is delayed three clock pulses via the flip flops 90, 91 and 92 connected as a shift register shifting at the system clock rate, such that a late sample pulse is then generated at 93 equivalent in time to the 787th clock pulse.

It is important to realize what happens if the external sync pulse has come to rest at almost the exact edge of the window. This is the condition that could be expected to lead to unstable operation, where the lock mechanism could jitter back and forth between two phase positions. This is prevented in the invention by virtue of the fact that the window is three counts wide, but the counter is adjusted in increments of two clocks. Thus, in the aforementioned case where the external sync has come to rest right at the edge of the window, it may eventually hit the edge of the window causing one of the phase comparators to reverse states. The early/late logic would then adjust the counter phase by two counts. It can be seen that the new position of the three count window is now two counts from its previous position, and the external sync pulse is now not at the edge of the new window position, but almost exactly one count from the edge. This is a stable position and the counter phase will not fluctuate.

The least significant bit (bit 0) of the horizontal counter is connected to the clock input of flip-flop 79. This flip-flop is configured as a divide-by-two circuit. On each active clock transition, the flip-flop reverses states. Since the frequency of bit 0 of the horizontal counter is half the system clock frequency, or 7.15909 MHz, the output of flip-flop 79 is a 3.579545 MHz square wave. This is the reference signal for the burst phase comparator in the burst phase locked loop mentioned above. The feature of having the color reference signal $F_{sq}$ at $F_{sc}$ be generated from the Horizontal Counter provides for the flip-flop 79 output to make transitions whenever the horizontal count is going from an even to an odd number, i.e. when the odd numbered pixels on the horizontal line of the memory in the digital system are being addressed. Since this reference signal $F_{sq}$ has a predetermined phase relationship to the colorburst (in the preferred mode set at 57° to coincide with the I color signal that is most often utilized in the digital video system) set primarily by the PLL parameters, it follows that zero crossings of the colorburst have a known phase relationship to horizontal counter bit 0 transitions. These phase relationships are arranged such that even states of the horizontal counter correspond to I or $-I$ portions of the subcarrier cycle and odd states of the horizontal counter always correspond to Q or $-Q$ portions of the subcarrier cycle. Since the counter bit zero transitions have a known phase relationship to the zero crossings of the colorburst, it follows that the active transitions of the system clock driving the counter have a known phase relationship to the 0° and 90° points of the colorburst, as shown in timing diagram FIG. 7. Active transitions of a clock signal are defind in reference to devices that use the clock to initiate some action being sensitive to either the positive going clock edges or the negative going clock edges but not both. In this system the active transitions are the positive going edges.

Although the even and odd states of the counter are now correlated to I, $-I$ and Q, $-Q$ portions of the color reference signal respectively, it is yet to be determined whether the color reference signal is positive or negative going at the beginning of the frame. Thus, there is an even chance of addressing the correct color phase in memory or reversed color phase, resulting in complementary colors.

Figure 6:
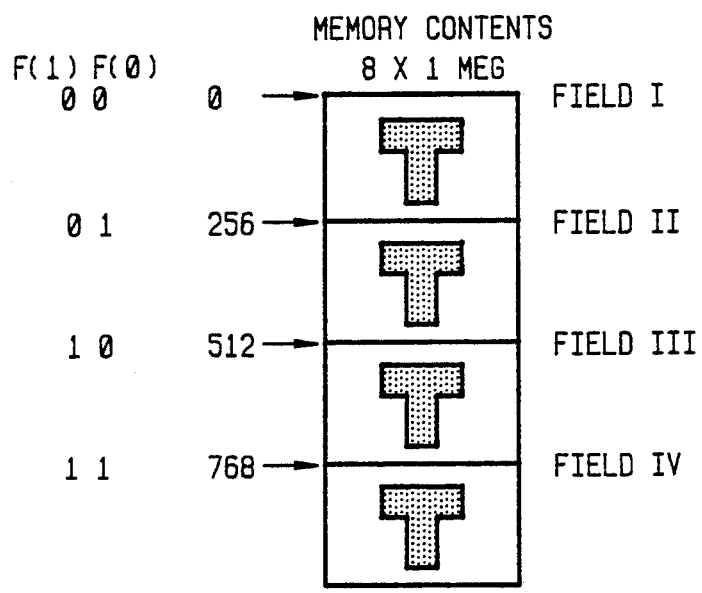
FIG. 6 is a representation of the 1 Meg. RAM memory contents of a video processing system showing the four fields.

This problem is solved by flip-flop 81 which samples the color reference phase once every frame to determine whether the pixels should be routed to the first pair of field memory banks or the second pair of field memory banks (FIG. 6) to produce the proper color phase relationship with the predetermined synthesized colorburst.

The signal which samples the reference phase is called the field sample pulse and is generated by decoding line 21 of the vertical counter. The decoded line 21 signal is gated with the output of the even-odd field detector so that the field sample pulse occurs on line 21 of every odd field (I or III), although other line numbers could be used. Although this procedure uses a reference to the ODD field detector, as can be seen, the even field will in effect likewise be detected and could be used as the reference instead.

The vertical counter 76 is incremented by the decoded 784 signal at the horizontal line rate. Thus the vertical counter counts scanlines. It is reset by the external vertical sync pulse which is derived from the composite sync signal from the sync stripper.

The signal from flip flop 81 then represents which pair of color fields are being processed. This signal F(1) in conjunction with the even/odd field signal F(0), uniquely determines the field number within the four color field sequence.

These two signals F(0) and F(1) are combined with other signals to form the video processing system memory addresses as the image is stored. The row address and column address each require a 10 bit address word in a 1 megabyte RAM memory. The least significant ten bits come from the horizontal counter to address the individual columns in the memory representing addresses along the horizontal line. Bits 10 through 17 come from the least significant eight bits of the vertical counter. Bit 18 F(0) comes from the even/odd field detector and bit 19, F(2), comes from the field sample flip-flop 79. Together these bits form a 20 bit address sufficient to accommodate the 1 megabyte four field memory array.

Thus a primarily digital synchronization system method and apparatus is shown for a digital composite video processing system to achieve the desired objectives.

While there have been shown and described particular embodiments of the invention, it will be obvious to those skilled in the art that changes may be made without departing from the invention or its equivalent and therefore it is intended by the appended claims to cover all such changes and modifications as fall within the true spirit and scope of the invention.

What is claimed is:

1. In a digital composite video system for digitally processing a composite video signal where said video signal has a color subcarrier and burst frequency $F_{sc}$, horizontal sync and vertical sync signals, and horizontal scan frequency $F_{hs}$, and produces four color fields I, II, II, and IV, and where the system has a system clock of frequency $nF_{sc}$ for system purposes including digitizing the video signal, and a horizontal counter counting to L incremented by the system clock at $nF_{sc}$ where N and L are integers, a method for synchronizing the system clock to the color burst signal such that active transitions of the system clock are in a known phase relationship to 0° and 90° points of the color burst signal and synchronizing the horizontal counter to the horizontal sync signal, comprised of the steps of:

first, locking the horizontal counter and the associated $nF_{sc}$ system clock generator to the color burst signal such that the positive going transitions of the bit of the counter cycling at $2F_{sc}$ are in a known phase relationship with zero crossings of the color burst signal;

second, incrementing the horizontal counter using the system clock to a pre-selected number L where L is an integer;

third, selecting a window based on a predetermined state of the horizontal counter that is (n/2)+1 system clock cycles wide during which the horizontal sync is desired to occur and then determining whether the horizontal sync occurs before, during, or after the window;

fourth, directing the counter to reset at count L−(n/2), L or L+(n/2) depending on when the horizontal sync pulse occurs in relation to the window;

fifth, sampling the color burst signal at regular intervals in order to determine which of the four color fields is being processed.

2. In a digital composite video system for digitally processing a composite video signal where said video signal has a color subcarrier and burst frequency $F_{sc}$, horizontal sync and vertical sync signals, and horizontal scan frequency $F_{hs}$, and produces four color fields I, II, II, and IV, two fields of which are called the EVEN pair and the other two are called ODD pair and where the system has a system clock of frequency $nF_{sc}$ for system purposes including digitizing the video signal, and a horizontal counter counting to L incremented by the system clock at $nF_{sc}$ where N and L are integers, a method for synchronizing the system clock to the color burst signal such that active transitions of the system clock are in a known phase relationship to 0° and 90° points of the color burst signal and synchronizing the horizontal counter to the horizontal sync signal, comprised of the steps of:

first, stripping the color burst signal from the video composite signal to create a stripped burst signal separating the composite sync from the video input signal and converting it to logic levels;

second, inputting the stripped burst signal to one of two phase comparator inputs of a phase locked loop circuit having an oscillator frequency of n times color subcarrier frequency $F_{sc}$, where n=an integer;

third, incrementing the system horizontal counter using the $nF_{sc}$ system clock signal from the phase locked loop circuit and generating counter reset signals L, L−(n/2) and L+(n/2) where L is one less than the ratio of the clock frequency to the horizontal frequency;

fourth, decoding the horizontal counter at counts of P and P+W where P+W is the window width equal to n/2+1 and (w/2) is the desired counter state at approximately the leading edge of the horizontal sync;

fifth, comparing the phase of each of the decoded outputs P and P+W to the leading edge of horizontal sync and then combining the two comparisons to produce compared sync outputs that are combined with the decoded L−(n/2), L and L+(n/2) outputs to create a signal that resets the horizontal clock at counts L−(n/2) L or L+(n/2) as determined respectively by whether the stripped horizontal sync pulse occurs before the decoded output P, between P and P+W, or after P+W, respectively;

sixth, detecting the vertical sync signal from the composite sync signal;

seventh, detecting the odd field pair called F(0) from the composite sync signal;

eighth, counting the horizontal lines of the composite video signal by clocking on each horizontal sync pulse and resetting the counter on each vertical sync pulse thus creating a nine-bit word $V_c$;

ninth, decoding the combination of F(0) and $V_c = X$ where X = a predetermined line number producing a color field sample pulse $F_{sp}$ every 1/30th second;

tenth, selecting the horizontal counter bit that cycles at frequency $2F_{sc}$ and connecting said bit output to a divide by two flip flop that produces a square wave at $F_{sc}$ and connecting this signal to the second input of the phase comparator;

eleventh, using the color field sample pulse to sample the square wave from the divide by two flip flop using a clocked D flip flop to determine the color field number.

3. The method in claims 1 or 2 where n=4, L=909, P=784, W=3.

4. In a digital composite video system for digitally processing a composite video signal where said video signal has a color subcarrier and burst frequency $F_{sc}$, horizontal sync and vertical sync signals, and horizontal scan frequency $F_{hs}$, and produces four color fields I, II, II, and IV, and where the system has a system clock of frequency $nF_{sc}$ for system purposes including digitizing the video signal, and a horizontal counter counting to L incremented by the system clock at $nF_{sc}$ where N and L are integers, apparatus for synchronizing the system clock to the color burst signal such that active transitions of the system clock are in a known phase relationship to 0° and 90° points of the color burst signal and synchronizing the horizontal counter to the horizontal sync signal, comprised of:

means for locking the horizontal counter and the associated $nF_{sc}$ system clock generator to the color burst signal such that the positive going transitions of the bit of the counter cycling at $2F_{sc}$ are in a known phase relationship with zero crossings of the color burst signal;

means for incrementing the horizontal counter using the system clock to a pre-selected number L where L is an integer;

means for selecting a window based on a predetermined state of the horizontal counter that is (n/2)+1 system clock cycles wide during which the horizontal sync is desired to occur and then determining whether the horizontal sync occurs before, during, or after the window;

means for directing the counter to reset at count L−(n/2), L or L+(n/2) depending on when the horizontal sync pulse occurs in relation to the window;

means for sampling the color burst signal at regular intervals in order to determine which of the four color fields is being processed.

5. In a digital composite video system for digitally processing a composite video signal where said video signal has a color subcarrier and burst frequency $F_{sc}$, horizontal sync and vertical sync signals, and horizontal scan frequency $F_{hs}$, and produces four color fields I, II, II, and IV, two fields of which are called the EVEN pair and the other two are called ODD pair and where the system has a system clock of frequency $nF_{sc}$ for system purposes including digitizing the video signal, and a horizontal counter counting to L incremented by the system clock at $nF_{sc}$ where N and L are integers, apparatus for synchronizing the system clock to the color burst signal such that active transitions of the system clock are in a known phase relationship to 0° and 90° points of the color burst signal and synchronizing the horizontal counter to the horizontal sync signal, comprised of:

means for stripping the color burst signal from the video composite signal to create a burst square signal separating the composite sync from the video input signal and converting it to logic levels;

means for inputting the stripped burst signal to one of two phase comparator inputs of a phase locked loop circuit having an oscillator frequency of n times color subcarrier frequency $F_{sc}$, where n = an integer;

means for incrementing the system horizontal counter using the $nF_{sc}$ system clock signal from the phase locked loop circuit and generating counter reset signals L, L−(n/2) and L+(n/2) where L is one less than the ratio of the clock frequency to the horizontal frequency;

means for decoding the horizontal counter at counts of P and P+W where P+W is the window width equal to n/2+1 and (w/2) is the desired counter state at approximately the leading edge of the horizontal sync;

means for comparing the phase of each of the decoded outputs P and P+W to the leading edge of horizontal sync and then combining the two comparisons to produce compared sync outputs that are combined with the decoded L−(n/2), L and L+(n/2) outputs to create a signal that resets the horizontal clock at counts L−(n/2) L or L+(n/2) as determined respectively by whether the stripped horizontal sync pulse occurs before the decoded output P, between P and P+W, or after P+W, respectively;

means for detecting the vertical sync signal from the composite sync signal;

means for detecting the odd field pair called F(0) from the composite sync signal;

means for counting the horizontal lines of the composite video signal by clocking on each horizontal sync pulse and resetting the counter on each vertical sync pulse thus creating a nine-bit word $V_c$;

means for decoding the combination of F(0) and $V_c = X$ where X = a predetermined line number producing a color field sample pulse $F_{sp}$ every 1/30th second;

means for selecting the horizontal counter bit that cycles at frequency $2F_{sc}$ and connecting said bit output to a divide by two flip flop that produces a square wave at $F_{sc}$ and connecting this signal to the second input of the phase comparator;

means for using the color field sample pulse to sample the square wave from the divide by two flip flop using a clocked D flip flop to determine the color field number.

6. The apparatus in claims 4 or 5 where n=4, L=909, P 784 W=3.

* * * * *